Feb. 26, 1935.  E. WATSON  1,992,517
GRASS CUTTER
Filed May 22, 1934
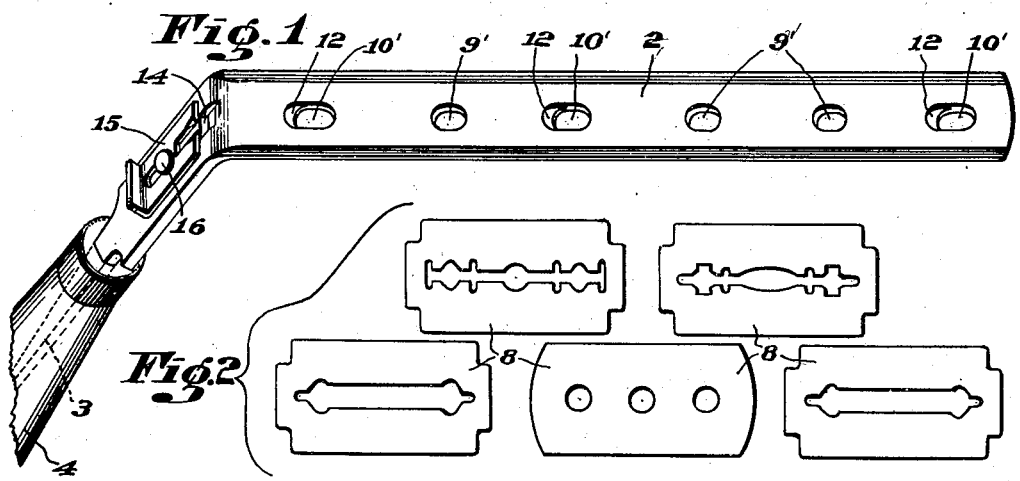
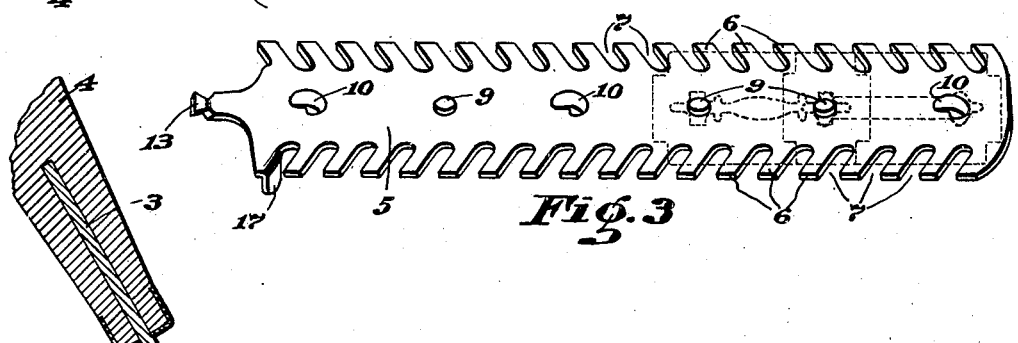
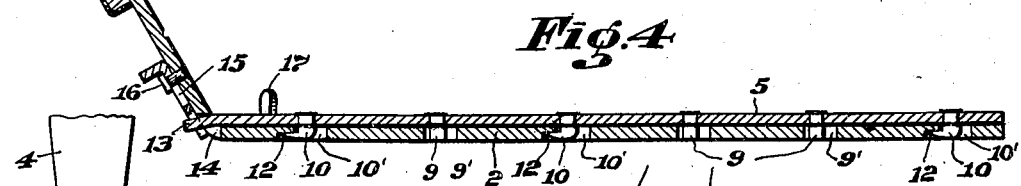
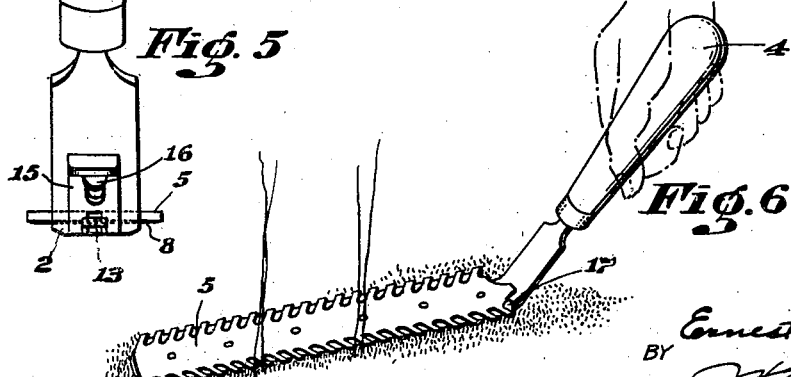
INVENTOR:
Ernest Watson,
BY
his ATTORNEY.

Patented Feb. 26, 1935

1,992,517

UNITED STATES PATENT OFFICE 1,992,517

GRASS CUTTER

Ernest Watson, Roslindale, Mass.

Application May 22, 1934, Serial No. 726,964

6 Claims. (Cl. 30—9)

This invention relates to grass cutters and implements of a similar nature.

The invention aims to devise an article of this general character in which discarded safety razor blades can be used and advantage can thus be taken of the exceptionallly keen edges of these blades which, in general, are regarded as useless.

The invention will be herein disclosed as embodied in a tool of this character designed especially for cutting the tough spears of grass and the spikes of certain weeds which are usually very difficult to cut with a lawn mower. The tool, however, is useful for other purposes, especially in trimming those parts of a lawn which are so located with reference to shrubbery, flower beds, or the like, that it is difficult, or impossible, to use a lawn mower on these areas.

The nature of the invention will be readily understood from the following description when read in connection with the accompanying drawing, and the novel features will be particularly pointed out in the appended claims.

In the drawing,

Figure 1 is a perspective view of the main body of an implement constructed in accordance with this invention;

Fig. 2 is a plan view showing different forms of safety razor blades suitable for use in this implement;

Fig. 3 is a perspective view of the guard which forms one element for the holder for the series of blades;

Fig. 4 is a vertical, central, sectional view of the implement;

Fig. 5 is a rear view of a portion therof; and

Fig. 6 is a perspective view illustrating one way in which it may be used.

The construction shown in the drawing comprises a relatively long narrow bar 2 provided with bevelled edges and bent near one end thereof, as clearly shown in Figs. 1, 4 and 6, the latter end terminating in a tang 3 on which a handle 4 is secured. Cooperatively associated with this bar is a guard 5 which also consists of a bar provided at its opposite edges with a series of fingers 6 separated by suitable slots 7. These two bars are designed to hold between them a series of double edged safety razor blades, such as those shown in Fig. 2 at 8. Any of a great variety of blades may be used, four different designs, all intended for use in a Gillette razor, being illustrated in Fig. 2. The blades are suitably centered in the holder and in approximately an end to end relationship, but with the end portions of adjacent blades overlapping each other, by means of a series of studs, some of which consist simply of short pins 9, while the others, shown at 10, are given a hook or L-shape. Each blade is provided with apertures near its opposite ends to receive the pins or studs 9 and 10, and they may be placed on the guard somewhat as indicated in dotted lines in Fig. 3.

In addition to performing the function of centering the blades, as just described, the studs 10 serve also to lock the guard 5 to the cap bar 2. As shown in Figs. 1 and 4, the latter bar is provided with elongated holes 9' to receive the plain pins or studs 9, and also with slots 10' to receive the respective studs 10. At the end of each of the latter slots there is also provided a depression 12 to receive the rearwardly extending portion or beak of the special studs 10. Usually the blades are placed on the guard 5 while it is in its inverted position, as shown in Fig. 3, and the cap bar 2 then is brought down upon the blades with the studs 9 and 10 projecting through the holes 9' and 10', respectively. Thereafter the guard bar 5 is moved backwardly toward the handle, thus sliding the hook portions of the studs 10 over upon the flat surfaces 12 and thus securing the bars 2 and 5 together in their blade clamping relationship.

For the purpose of locking these bars in this relationship, the guard 5 is provided at its rearward end with a dove-tail extension 13 which, during the relative movement of the bar as just described, passes through the hole 14 formed through the bent portion of the bar, after which a latch 15, which is slidably mounted on the inclined part of the bar 2, is forced downwardly into the position shown in Figs. 4 and 5 where it locks the guard 5 against any longitudinal movement relatively to the bar 2. As shown in the drawing, the latch 15 is provided with a slot having bevelled edges to straddle the tapered sides of the extension 13 on the guard 5. A stud 16, on which the latch 15 is slidably mounted, secures the latch in its operative position on the inclined portion of the bar 2.

When the series of blades has been clamped between the bars 2 and 5 in the manner above described, the implement then is ready for use. Usually it is held in the hand, as shown in Fig. 6, with the main portion of the holder extending parallel to the surface of the ground. As above stated, it is particularly effective in cutting off the tough, flexilbe blades of grass and spikes of weeds which resist the action of the lawn mower or are so tall that the lawn mower cannot cut them effectively. The cutting action of this implement is facilitated by the inclination of the slots 7 in a backward direction toward the handle which, due to the natural motion given to the tool, facilitates the entrance of these blades and spikes into the slots where they immediately strike the keen edges of the blades 8 and are severed. It should be observed that the fingers 6 of the guard project beyond the two lines of blade edges at the opposite sides of the holder for them, and lie close to the lower surface of the guard. Consequently, it is almost impossible for a person to cut himself.

When the blades become dull, they may be removed by forcing the latch 15 upwardly so that it releases the guard 5, after which the guard may be slid forward far enough to unlock the studs 10 from the cap bar 2, and then the guard may be lifted off, and the blades may be removed and replaced by others. The unlocking movement of the guard is facilitated by the presence of a lug 17, integral with the guard, and against which the thumb may be pressed to force the guard forward. Preferably the fingers 6 at one edge of the guard are staggered with reference to those at the opposite edge, or, in other words, the fingers at one edge lie directly opposite the slots 7 of the other edge. Obviously those portions of the cutting edges immediately under the fingers are not subjected to any substantial degree of wear. Consequently, when the blades become dull they may be turned over, edge for edge, at which time those portions of the edge formerly protected by the fingers 6 at each side of the tool will be positioned directly under the slots at the opposite side, so that these unused portions of the edges will then be so located as to perform the cutting operation, while the dull portions will then be under the fingers and therefore not in position to do any substantial amount of cutting. With this arrangement, therefore, the entire lengths of both edges of all the blades can be utilized.

While I have herein shown and described a preferred embodiment of my invention, it will be understood that the invention may be embodied in other forms without departing from the spirit or scope thereof.

Having thus described my invention, what I desire to claim as new is:

1. In a cutting implement of the character described, the combination of a holder for releasably supporting a plurality of safety razor blades in an approximately end to end relationship, said holder including a guard having fingers projecting beyond the edges of the blades and extending diagonally with reference to said edges, and a handle for said holder.

2. In a cutting implement of the character described, the combination of a holder for releasably supporting a plurality of safety razor blades in an approximately end to end relationship, said holder including a guard having fingers projecting beyond the edges of the blades, and a handle for said holder, the fingers of said guard being separated by slots extending diagonally toward said handle.

3. In a cutting implement of the character described, the combination of a holder for releasably supporting a plurality of double edged safety razor blades in an approximately end to end relationship, said holder including a guard having fingers projecting at opposite sides thereof beyond the opposite edges of the blades, and a handle for said holder.

4. In a cutting implement of the character described, the combination of a holder comprising a guard bar and a cap bar cooperating therewith to clamp a plurality of safety razor blades between them in approximately an end to end relationship, one of said bars having pins to position said blades, means for releasably locking said bars together in their blade clamping relationship, and a handle secured to one end of said holder.

5. In a cutting implement of the character described, the combination of a holder comprising a guard bar and a cap bar cooperating therewith to clamp a plurality of safety razor blades between them in approximately an end to end relationship, one of said bars having pins to position said blades, means operable by relative lengthwise movement of said bars to lock the bars together in their blade clamping relationship, and a handle secured to said holder.

6. In a cutting implement of the character described, the combination of a holder comprising a guard bar and a cap bar cooperating therewith to clamp a plurality of safety razor blades between them in approximately an end to end relationship, said bars having cooperating parts serving to lock them normally together in their blade clamping relationship but said parts being releasable by relative endwise movement of said bars, a latch for releasably securing said bars against said endwise movement, and a handle for said holder.

ERNEST WATSON.